United States Patent [19]

Hommelet

[11] Patent Number: 5,711,487
[45] Date of Patent: Jan. 27, 1998

[54] MOTOR VEHICLE SCREEN WASHING APPARATUS FOR SCREEN WASHING LIQUID DELIVERY

[75] Inventor: Stéphane Hommelet, Chatellerault, France

[73] Assignee: Valeo Systemes D'Essuyage, La Verriere, France

[21] Appl. No.: 500,443

[22] Filed: Jul. 10, 1995

[30] Foreign Application Priority Data

Jul. 13, 1994 [FR] France .................. 94 08833

[51] Int. Cl.$^6$ .................................. B05B 1/10
[52] U.S. Cl. .................................. 239/284.1
[58] Field of Search ............... 239/284.1, 264; 15/250.001, 250.01, 250.04; 285/382

[56] References Cited

U.S. PATENT DOCUMENTS

| | | | |
|---|---|---|---|
| 4,650,228 | 3/1987 | McMills et al. | 285/382 X |
| 5,173,986 | 12/1992 | Bohmer et al. | 239/284.1 X |
| 5,195,206 | 3/1993 | Bauer et al. | 239/284.1 X |
| 5,301,877 | 4/1994 | Madison | 285/382 X |
| 5,454,134 | 10/1995 | Edele et al. | 239/284.1 X |
| 5,561,882 | 10/1996 | Eustache et al. | 239/284.1 X |

FOREIGN PATENT DOCUMENTS

| | | |
|---|---|---|
| 0505255 | 9/1992 | European Pat. Off. |
| 056462 | 11/1993 | European Pat. Off. |
| 1198770 | 7/1970 | United Kingdom |
| 90/10562 | 9/1990 | WIPO |
| 92/21536 | 12/1992 | WIPO |

*Primary Examiner*—Lesley D. Morris
*Attorney, Agent, or Firm*—Morgan & Finnegan, LLP

[57] ABSTRACT

A screen washing apparatus, especially for a glass surface of a motor vehicle, in which a shaft is formed with a through duct and is carried by the casing of a motorized reduction gear unit. The reduction gear unit drives the screen wiper and imparts to the shaft an alternating rotary motion through a drive element. An end portion of the shaft penetrates sealingly into a bore that is formed in a tubular connector. The tubular connector joins the apparatus to a flexible pipe leading from a screen washing liquid supply circuit. The tubular connector and the end portion of the shaft are coupled together in rotation by a mating coupling, and the shaft has, at its end penetrating into the tubular connector, a knurled surface and a spherical portion, the spherical portion deforming the bore of the tubular connector radially outwardly.

7 Claims, 3 Drawing Sheets

MOTOR VEHICLE SCREEN WASHING APPARATUS FOR SCREEN WASHING LIQUID DELIVERY

FIELD OF THE INVENTION

The present invention relates to screen washing apparatus, especially for motor vehicles.

BACKGROUND OF THE INVENTION

Screen washing apparatuses have in the past been proposed, which comprise a control or drive unit such as a motorized reduction gear unit, consisting of an electric motor associated with a reduction gear assembly that confers alternating rotary motion on an output shaft which is coupled to the motorized gear unit. This output shaft is generally coupled to a screen wiper arm, either directly or indirectly, for example through a drive crank mechanism.

As is known, in particular from French published patent specification FR-2 497 745A, the output shaft has a bore which is open at both ends of the shaft, with one end of this bore being connected to a device for projecting screen washing liquid onto a glass surface such as a motor vehicle windshield, while the other end is open axially into a fixed, pot-shaped tubular connector. The apparatus further includes a feed tube which is connected through a flexible duct to a screen washing liquid reservoir via a washing liquid pump.

In such arrangements, it is of course important to provide proper sealing for the connection between the rotating output shaft and the pot-shaped tubular connector, which is generally coupled fixedly to the cover plate of the casing of the motorized reduction gear unit.

In the above mentioned French patent specification, the output shaft extends through a first sealing ring which is carried by the cover plate and which prevents any lubricant present in the reduction gear assembly from penetrating into the pot-shaped tubular connector. The upward shaft also carries, in a groove which is arranged at that one of its ends that penetrates into the pot, a second sealing ring which provides sealing between the screen washing liquid that enters the pot, on the one hand, and the shaft on the other hand.

However, that arrangement has some disadvantages which can seriously affect its operation. In this connection, during the assembly operation, the cover plate which carries the first sealing ring and the pot-shaped tubular connector covers the end of the output shaft that carries the second sealing ring. During this movement, the two sealing rings come into contact with each other, and it can happen that one of the rings becomes dislodged by the other, without the person who is carrying out the operation being able to realize that this has happened. Thus, serious sealing problems can arise in the apparatus, carrying the danger of subsequent malfunction.

In order to overcome these drawbacks, it has previously been proposed, in an earlier patent application of the present Applicants, namely French published patent specification FR-2 674 489A, to provide sealing between the output shaft and the pot-shaped tubular connector by means of two sealing rings which are fitted in positions spaced away from each other within the pot, the sealing rings being supported by a support member which is itself mounted within the pot. Although that arrangement gives good and reliable sealing, it does still have the drawback that it requires the use of a large number of components, and for this reason it is quite costly to produce.

DISCUSSION OF THE INVENTION

An object of the present invention is, accordingly, to overcome this problem by providing a very simple screen washing apparatus which comprises a minimum number of components while giving perfect sealing.

According to the present invention, a screen washing apparatus, especially for a glass surface of a motor vehicle, comprising a shaft which carries a duct, the shaft being carried by a casing of a motorized reduction gear unit and being given alternating rotary motion by means of a driving element, with one end of the shaft penetrating sealingly into a bore of a tubular connector for connection to a flexible duct leading from a screen washing fluid supply circuit, is characterized in that the tubular connector and the end portion of the shaft are coupled in rotation with each other by mating coupling means, and in that the shaft includes, at that one of its ends that penetrates into the tubular connector, a spherical portion which is adapted to deform the bore of the tubular connector radially outwardly.

The invention makes it unnecessary to provide more than one tubular connector, and this reduces the cost.

In addition, because of the deformation caused by the spherical portion, intimate contact is set up between the spherical portion of the end portion of the shaft and the bore in the tubular connector. This seals the system between the tubular connector and the shaft. Sealing of the system is thus ensured, without adding any supplementary component such as sealing rings.

According to a preferred feature of the invention, the mating coupling means comprises a projection situated at the end of the shaft and adapted to be received in the bore of the tubular connector.

According to a further preferred feature of the invention, the means for coupling the shaft and the tubular connector together for rotation together comprises a knurled surface located at the end of the shaft and adapted to be received in the bore of the tubular connector.

Thus, during the operation of assembling the tubular connector on the end of the shaft of the apparatus, the tubular connector can be presented in facing relationship with the end portion of the shaft in any angular position whatsoever. This enables the most appropriate angular indexation to be selected for the connection of the apparatus to the screen washing fluid supply circuit.

According to yet another preferred feature of the invention, the bore in the tubular connector comprises a tubular first portion for receiving the portion of the shaft having the knurled surface, together with a tubular second portion for receiving the spherical portion of the shaft.

According to a still further preferred feature of the invention, the tubular first portion of the bore in the tubular connector has a diameter different from that of the tubular second portion thereof.

According to another preferred feature of the invention, the screen washing apparatus, in which the casing includes a cover plate through which the shaft extends, is characterized in that the cover plate carries a ring molded onto the cover plate and surrounding the vicinity of the end of the shaft itself, and in that the tubular connector has a radial collar portion which at least partially covers the molded ring, so as to seal the apparatus against grease and dust.

According to a further preferred feature of the invention, the radial collar portion includes a projecting flange which encloses the molded ring.

According to yet another preferred feature of the invention, the apparatus, in which the casing is closed by an electronic housing which also serves as a closure plate for the casing, and in which the electronic housing includes a closure plate, is characterized in that the shaft extends through the electronic housing via a hole in the latter, in that the electronic housing has an axial projection which surrounds the vicinity of the end of the shaft, and in that the tubular connector has a radial collar portion which at least partially covers the projection, so as to prevent the ingress of any pollutants into the apparatus.

According to a still further preferred feature of the invention, the shaft extends through the electronic housing via a hole in the latter, and through the closure plate of the electronic housing via another hole, and the cover plate has an axial projection which surrounds the shaft at the end of the shaft, with the tubular connector having a radial collar portion which at least partially covers the projection, so as to protect the apparatus against the ingress of pollutants.

With this arrangement, sealing is reinforced because it is obtained outside the electronic housing, which affords improved protection for the fragile electronic components that are present in the electronic housing.

The invention also provides a method of assembly for a screen washing apparatus characterized in that it includes the following steps:

the tubular connector, having a bore with a smooth side wall, is presented in facing relationship with the end portion of the shaft;

in an axial movement, the shaft penetrates into the bore in such a way that (a) the knurled surface on the end portion of the shaft causes grooves of complementary form to be formed in the bore, and (b) the spherical portion at the end of the shaft deforms the bore radially outwardly.

Further features and advantages of the present invention will appear more clearly on a reading of the detailed description of some preferred embodiments of the invention, which follows, and which is given by way of example only and with reference to the accompanying drawings.

BRIEF DESCRIPTION WITH DRAWINGS

DESCRIPTION OF PREFERRED EMBODIMENTS OF THE INVENTION

Figure 1:
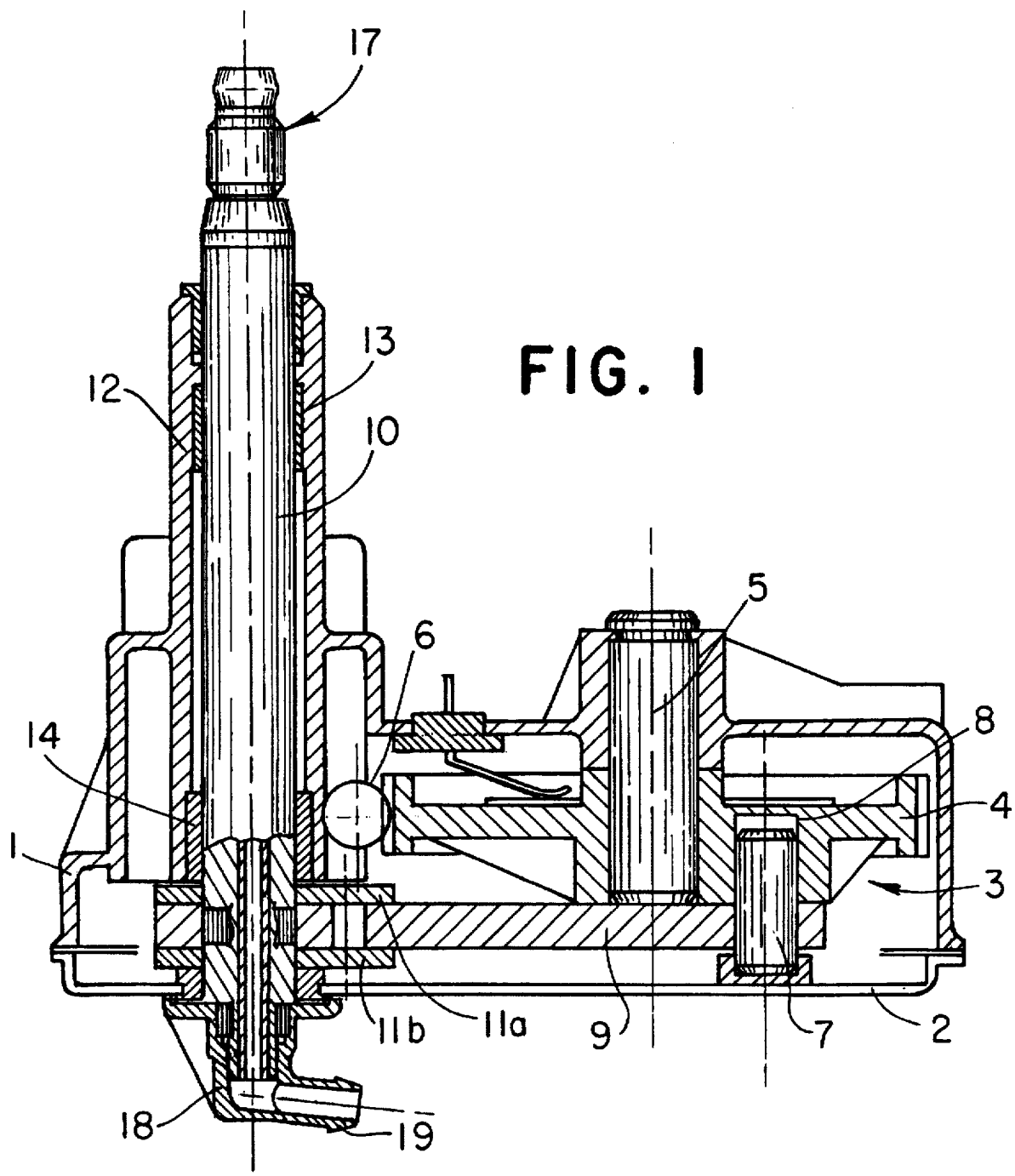
FIG. 1 is a view in cross section showing a screen washing apparatus in accordance with the present invention.

FIG. 1 shows part of a motorized reduction gear unit. This unit comprises an electric motor, not shown, and a speed reducing gearbox comprising gearing enclosed within a casing 1, which is closed by a cover plate 2. The reduction gearing contained in the casing is indicated at 3, and consists, in a manner known per se, of a toothed wheel 4 which is moveable in rotation about an axis 5, and a worm 6 which is coupled to the rotor of the electric motor and drives the toothed wheel 4. The toothed wheel 4 carries a pin 7 parallel to the axis 5 and substantially eccentric with respect to the latter. The pin 7 is freely rotatable in a bore 8 formed in the toothed wheel 4.

The pin 7 is coupled to a linkage of the crank and connecting rod type which consists, conventionally, of an arm 9 acting as a connecting rod and coupled at one of its ends to the pin 7, while the other end of the arm 9 carries a toothed sector which meshes with another toothed sector, the latter being coupled fixedly to the output shaft 10. The two toothed sectors are held in constant engagement by means of two retaining and balancing elements 11a and 11b, which lie on either side of the longitudinal faces of the toothed sectors, enabling the arm 9 to be coupled rigidly to the output shaft 10. In this way, the crank and connecting rod linkage converts the unidirectional rotary motion of the toothed wheel 4 into alternating rotary motion of the output shaft 10.

The output shaft 10 is mounted in a hollow tubular pedestal 12, situated at the base of the casing 1 and containing two bearings 13 and 14 in which the shaft 10 is rotatable. The shaft 10 has an internal bore 15, which contains a tube 16. The tube 16 is preferably made of copper and is force-fitted into the bore 15 of the output shaft 10.

The output shaft 10 is connected at one of its ends, 17, to a screen wiper arm (not shown), which carries a screen wiper blade for wiping over a glass surface, such as a motor vehicle windshield. The other end of the output shaft 10 extends through the cover plate 2, to terminate inside a tube connector 18 by which the assembly shown in the drawing is coupled to a screen washer fluid supply circuit (not shown). This supply circuit comprises a reservoir containing screen washing fluid, and a pump which delivers the screen washing fluid through a flexible tube which is fitted on the nozzle 19 of the tube connector 18. From the nozzle 19, the fluid passes, through the duct defined by the tube 16 within the output shaft 10, to the mouth of the tube 16 that lies adjacent to the screen wiper arm, and thence to a flexible tube connected to a jet nozzle which is disposed close to the windshield.

Figure 2:
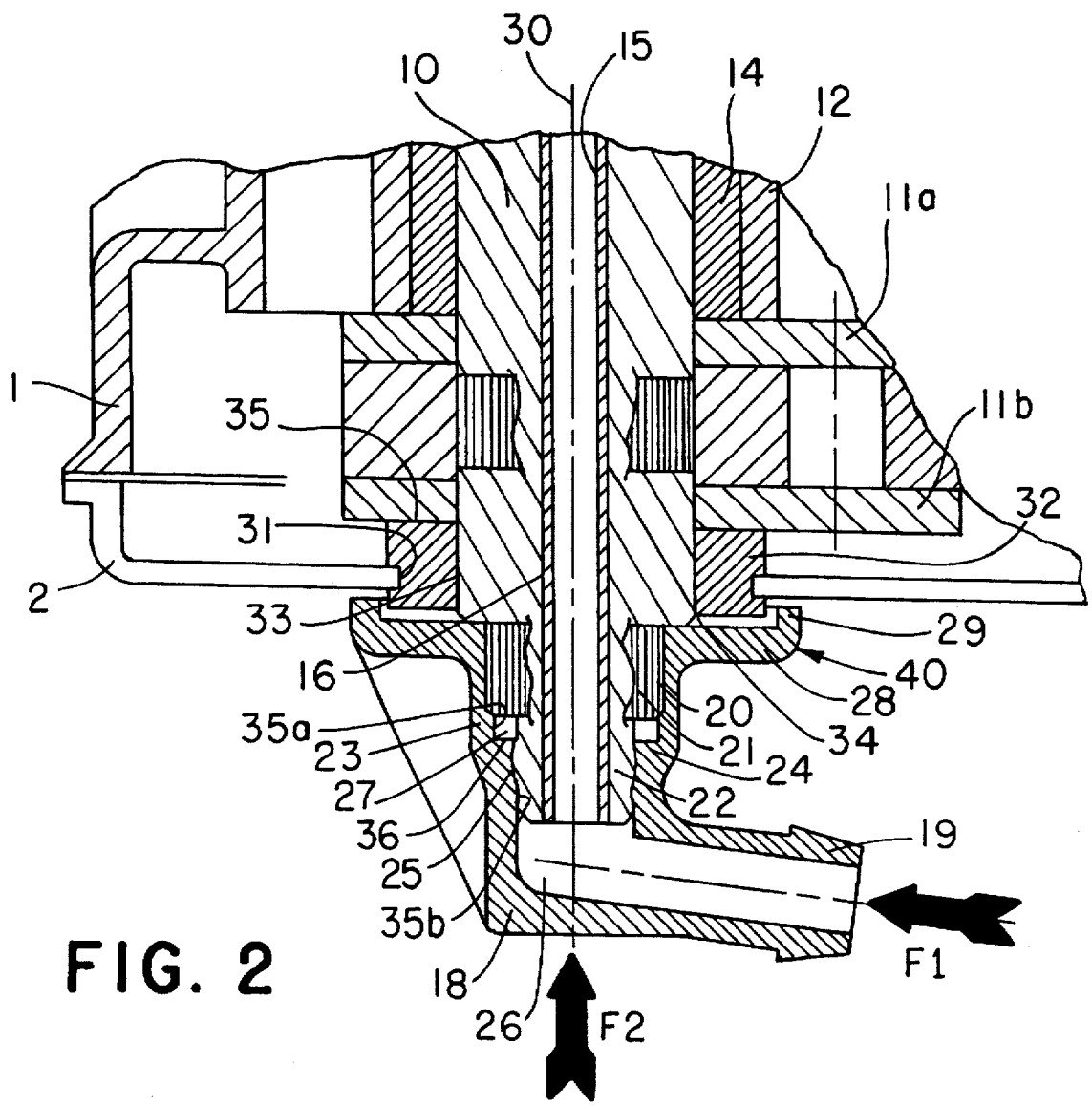
FIG. 2 shows a detail of FIG. 1, in cross section and on a larger scale.

Referring now to FIG. 2, this shows one embodiment of the present invention in more detail. Those elements which are similar to those in FIG. 1 carry the same reference numerals, and will not be described any further. The arrow F1 in FIG. 2 shows the direction in which the screen washing fluid delivered from the screen washing circuit arrives at the tube connector 18, passing through the admission nozzle 19 of the latter.

The output shaft 10, at its end which penetrates into the tube connector 18, has a cylindrical first portion 20, the diameter of which is smaller than the outside diameter of the output shaft 10. The cylindrical first portion 20 has a knurled surface 21. A second portion 22 of the output shaft 10, at the same end of the latter, is generally spherical in form and includes the lower mouth of the tube 16, i.e. that shown at the bottom of FIG. 2. The diameter of the spherical portion 22 is smaller than that of the cylindrical first portion 20.

The tube connector 18 is generally pot-shaped, and is preferably made of a suitable plastics material. It has a bore consisting of two successive bore portions 35a, 35b formed in a tubular first portion 23 of the connector 18 and a tubular second portion 24, respectively. The diameter of the upper bore portion 35a is substantially smaller than that of the cylindrical portion 20 of the end of the output shaft 10, such that when the tube connector is fitted by being force fitted onto the end of the output shaft 10 in the direction indicated by the arrow F2 in FIG. 2, the knurled surface 21 of the cylindrical portion 20 enters into the initially smooth wall of the bore 35a of the tubular portion 23. In this way the tube connector 18 is fixed to the output shaft 10 in such a way that it cannot rotate which respect to the latter.

The tubular portion 23 of the tube connector 18 is extended axially, and integrally, into the lower part of the tube connector 18, at the bottom of FIG. 2, by the second tubular portion 24. This portion 24 is arranged coaxially with the first tubular portion 23, but the diameter of its bore 35b is smaller than that of the bore 35a of the tubular portion 23, the difference in diameter between these two bores defining a radial shoulder 36.

The diameter of the bore 35b of the tubular second portion 24 is also substantially smaller than that of the spherical portion 22 of the end of the output shaft 10. In this way, when the tube connector 18 is assembled by being force fitted onto the end of the output shaft 10, the spherical portion 22 deforms the bore 35b of the tubular second portion 24 radially outwardly. The resulting deformation of the bore 35b is indicated at 25 in FIG. 2. The deformation 25 fixes the axial position of the tube connector 18 with respect of the output shaft 10.

The feed nozzle 19, which is an extension of the tubular connector 18, is integral with the tubular second portion 24 of the latter, and extends in a direction which is substantially at right angles to the axis 30 of the output shaft 10. The feed nozzle 19 connects the cavity 26 within the tubular connector 18 with the flexible tube, connected to the reservoir of the screen washing circuit via a pump, already mentioned.

Sealing of the system between the tubular connector 18 and the output shaft 10 is provided by the connection between the spherical portion 22 of the end of the output shaft 10 and the tubular second portion 24 of the tubular connector 18. In this regard, the deformation 25 of the bore 35b of the tubular portion 24 ensures intimate contact between the outer surface of the spherical portion 22 and the inner surface of the tubular portion 24, thus preventing any liquid from passing between these two surfaces. Thus, the screen washing liquid that passes through the feed nozzle 19 into the cavity 26 is unable to penetrate into the space 27 within the tubular first portion 23 of the tubular connector 18, which would give rise to the danger of subsequent penetration of the fluid into the interior of the casing 1 of the motorized reduction gear unit.

As has already been seen above, the tubular connector 18 and the output shaft 10 are coupled together in rotation by virtue of the knurled surface 21 formed on the end portion 20 of the output shaft. In this way the tubular connector 18 is forced to perform alternating rotary motion with the output shaft.

This fastening against any relative rotation between the output shaft and the tubular connector could equally be obtained by the provision of a flat (not shown) on the first end portion 20 of the output shaft. This flat is then arranged to cooperate with a complementary profile (not shown) formed in the tubular first portion 23 of the tubular connector 18. However, in this case, during the fitting operation, at the instant when the tubular connector 18 meets the output shaft 10, it is necessary to locate the former in a precise angular position, so that the flat on the end portion 20 of the output shaft is in proper register with the complimentary profile of the tubular connector. For this reason, the provision of the knurled surface 21 is the preferred means for obtaining coupling between the connector 11 and shaft 10 against relative rotation between them.

In this preferred embodiment having the knurled surface, at the instant when the connector 18 meets the shaft 10 during fitting of the former on the latter, the connector 18 can be presented in any angular position with respect to the output shaft prior to being force fitted onto it in the direction of the arrow F2. Accordingly, it becomes possible to select the angular position that is the best in terms of the connection of the feed nozzle 19 with the flexible tube that connects it to the screen washing fluid circuit.

With these arrangements, quantity production of the apparatus will be facilitated by the fact that, with identical components, assembly can be carried out with angular indexing of the tubular connector (with respect to the output shaft) which is specific to each particular application.

In addition, the cover plate 2 of the motorized reduction gear unit is a standard component, in which a hole 31 is formed for the passage through it of the end portion of the output shaft 10, on which the tubular connector 18 is subsequently fitted. The diameter of the hole 31 is greater than the outer diameter of the output shaft 10, being such that a ring 32, which is preferably of a suitable plastics material, can be molded into the hole 31. The ring 32 then provides a passage for the output shaft 10. The ring 32 has an internal diameter which is substantially equal to the outer diameter of the output shaft 10, while still enabling the latter to perform its alternating rotary motion without the ring 32 exerting any braking action. The ring 32 has an axial thickness which is larger on the side of the cover plate 2 that faces into the casing 1 than on the other side, i.e. the lower side in FIG. 2. It thus offers an engagement surface 35 for the retaining element 11b of the crank and connecting rod linkage, and locates the output shaft 10 against any axial movement.

The axial thickness of the ring 32 on the side of the cover plate 2 which defines the outside of the casing of the motorized reduction gear unit is such that, when the output shaft 10, equipped with its crank and connecting rod linkage, is engaged in the hole 31, and the retaining element 11b engages on the surface 35 of the molded plastics ring 32, that part of the output shaft 10 that extends axially beyond the external surface of the cover plate has an axial dimension which is greater than the axial thickness of the ring 32 on that side of the cover plate. In addition, the annular contact indicated at 33 in FIG. 2, between the ring 32 and the output shaft 10, prevents penetration of any dust into the casing 1 of the motorized reduction gear unit, and also prevents any lubricant that may be present within the reduction gear assembly from penetrating into the tubular connector 18.

This sealing effect is reinforced by a radial collar portion 40 of the tubular connector 18. In this connection, the radial collar portion 40 comprises a flat ring portion 28, formed integrally with the tubular portion 23 of the tubular connector 18 and extending radially. The collar portion 40 is centered on the axis 30 of the output shaft 10 when the tubular connector 18 is mounted on the latter, the ring portion 28 having at its periphery a flange 29 which projects towards the cover plate 2. The diameter of the ring portion 28 is slightly greater than that of the molded ring 32, as can clearly be seen in FIG. 2. When the tubular connector 18 is mounted on the output shaft by force fitting, the ring portion 28 of the radial collar portion 40 bears on a shoulder 34 which is defined by the difference in diameter between the main body of the output shaft 10 and its end portion 20. In this arrangement, the projecting flange 29 of the radial collar portion 40 surrounds the molded ring 32, thus reinforcing the sealing of the apparatus against grease and dust.

In summary, the apparatus in accordance with the invention provides a tubular connector 18 for providing a connection between a screen washing fluid circuit and a hollow output shaft 10 of a motorized reduction gear unit, which has the following effects:

it prevents any lubricant present in the reduction gear unit from penetrating into the tubular connector, by the sealing effect provided by the annular contact at 33;

it prevents any dust penetrating from outside into the casing of the reduction gear unit, by providing sealing due to the radial collar portion 40;

it prevents any screen washing liquid, supplied from the reservoir of the washing liquid circuit, from penetrating into the casing, by providing sealing due to the deformation 25 of the tubular portion 24; and its cost is reduced and it is highly reliable.

Figure 3:
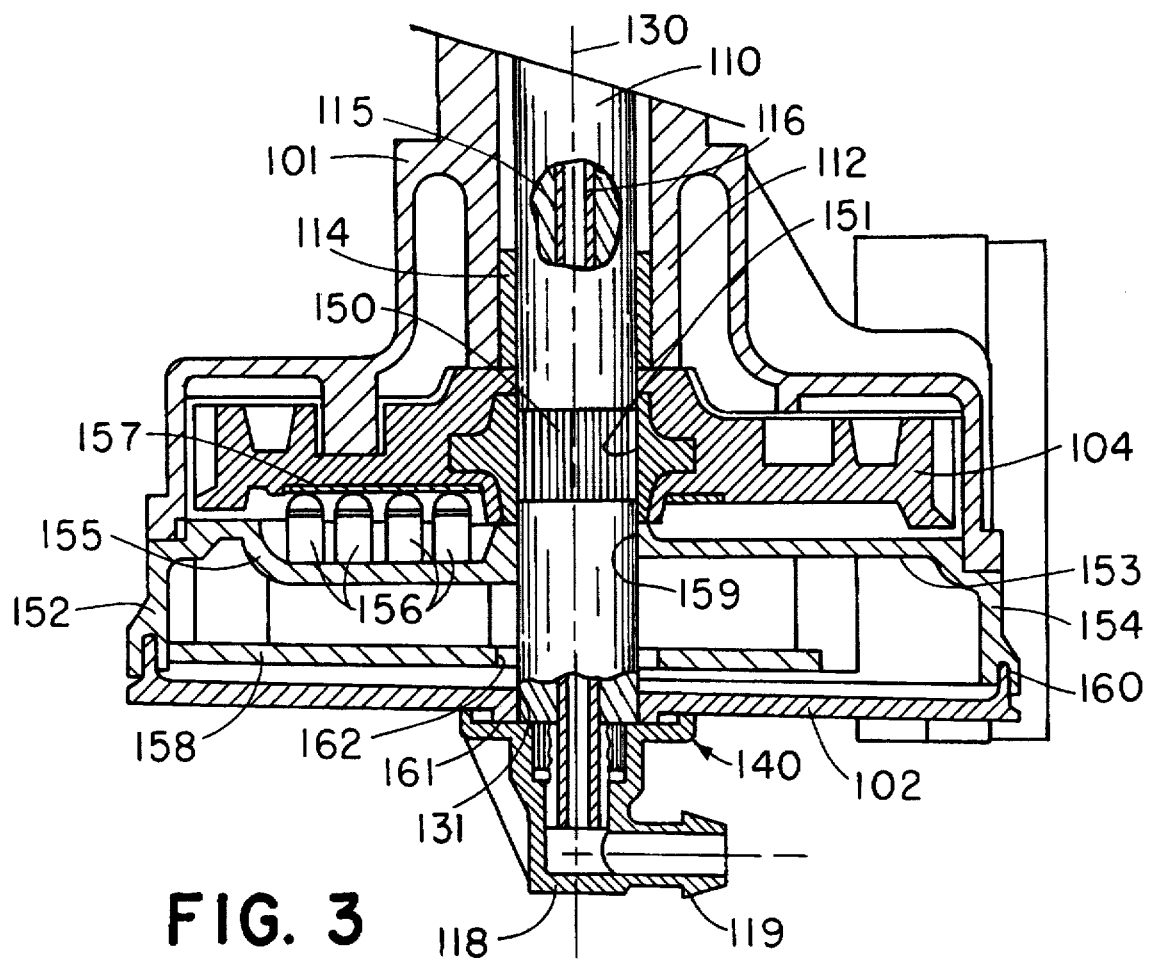
FIG. 3 is a view in cross section of a screen washing apparatus in a second embodiment of the invention.

Reference is now made to FIG. 3, which shows another embodiment of the invention. In this example, a motorized reduction gear unit consists of a motor (not shown) and a reduction gear unit enclosed in a casing 101. The reduction gear system comprises a toothed wheel 104, which is rotatable about an axis 130 and which is driven by a worm (not shown) coupled to the rotor of the electric motor. The output shaft 110 of the reduction gear unit is mounted within a pedestal 112 and within a bearing 114.

In this embodiment, the tooth wheel 104 is coupled in rotation with the output shaft 110 of the reduction gear unit, through a knurled surface 150 formed on the output shaft 110 and fitted into a bore 151 of the toothed wheel 104.

The casing 101 of the reduction gear unit is closed by an electronic housing 152. This housing 152 is preferably made of a suitable plastics material and is generally basin-shaped, having a substantially flat base 153 and including a cylindrical side portion 154, which extends axially so as to extend the casing 101.

The substantially flat base 153 of the electronic housing 152 has a recessed portion 155 which carries four friction elements 156. These elements 156 are arranged in facing relationship with the toothed wheel 104, and are adapted for frictional contact on a metallic plate 157 which is fixed on the surface of the toothed wheel 104 that faces towards the electronic housing 152. The friction elements 156 are connected to a printed circuit 158 located within the electronic housing 152. In a known way, this arrangement enables the position and direction of rotation of the toothed wheel 104 to be controlled, by controlling the stopping and directions of rotation of the electric motor mentioned above.

On its lower part with reference to FIG. 3, the electronic housing 152 is closed by a cover plate 102, which is preferably made of a suitable plastics material and which is clipped onto flanges 160 of the cylindrical side portion 154 of the electronic housing.

The output shaft 110 of the reduction gear unit, the axis 130 of which is coincident with the axis of rotation of the toothed wheel 104, has a through bore 115 which contains a tube 116, the latter being held within the bore 115.

The output shaft 110 extends through the electronic housing 152 via a hole 159 formed in the substantially flat base 153 of the latter. The diameter of the hole 159 is substantially equal to that of the shaft 110. The shaft 110 extends through the printed circuit 158 via a hole 162 formed in the latter and having a diameter greater than that of the shaft 110, so that the shaft and printed circuit are not in contact with each other. The shaft 110 also extends through the cover plate 102 of the electronic housing 152, via a hole 131 formed in the latter and having a diameter which is substantially equal to that of the output shaft 110.

The end of the shaft 110 terminates in a tubular connector 118 which connects the apparatus to the screen washing liquid circuit. The tubular connector 118 and the end portion of the shaft 110 will not be described any further here, because they are similar to the tubular connector 18 and end portions 20, 22 of the output shaft 10 described above with reference to FIG. 2.

At the level of the hole 131 in the cover plate 102, there is an axial projection 161 which extends outwardly of the motorized reduction gear unit and which is made integrally with the cover plate 102. This projection 161 surrounds the output shaft 110 close to the end of the main body of the shaft 110. It performs substantially the same function as the molded ring 32 in FIG. 2 described above, of preventing dust penetrating from outside into the electronic housing 152. In this connection, by virtue of this projection 161, the annular contact between the output shaft 110 and the hole 131 is increased in its axial direction, which makes it more difficult for dust to penetrate into the electronic housing.

This dust seal is also reinforced by a radial collar portion 140 of the tubular connector 118. The collar portion 140 surrounds the projection 161, when the connector 118 is fitted on the shaft 110.

In addition, sealing against the penetration of screen washing liquid, supplied from the above mentioned circuit and entering the tubular connector 118 via its feed nozzle 119, is provided by the intimate joint between the tubular portion of the connector 118 and the spherical portion (not given a reference numeral in FIG. 3) of the end portion of the output shaft 110, in the same way as has been described above with reference to FIG. 2.

In this modified embodiment of the invention, the electronic housing 152 carries fragile electronic components on the printed circuit 158, and is protected from any possible danger of deterioration of the printed circuit due to microscopic leakage, by the fact that sealing is obtained outside the electronic housing.

It will be clearly understood that the apparatus described above is not in any way limiting, and that any desirable modifications can be made without, in so doing, departing from the scope of the invention.

What is claimed is:

1. A screen washing apparatus for screen washing liquid delivery comprising a motorized reduction gear unit having a casing, a shaft carried by the casing and defining a duct through the shaft, a driving element in the casing, means coupling the driving element to the shaft for alternating rotary movement of the shaft, the shaft having an end portion, a tubular connector for delivery of the screen washing liquid, the tubular connector having a bore, and the end portion of the shaft extending sealingly into the tubular connector, wherein the end portion of the shaft and the tubular connector together define mating coupling means which couple the tubular connector and the shaft together, whereby the tubular connector performs the same alternating rotary motion as the shaft, the end portion of the shaft having a terminal portion received in the bore of the tubular connector, the terminal portion being spherical to deform the bore radially outwardly, the end portion of the shaft having a knurled surface, the knurled surface being received in the bore of the tubular connector to couple the shaft and the tubular connector together in rotation, wherein the tubular connector has a tubular first portion for receiving the knurled surface end portion of the shaft and a tubular second portion for receiving the spherical terminal portion of the shaft, the knurled surface portion being spaced from the terminal portion of the shaft.

2. A screen washing apparatus for screen washing liquid delivery comprising a motorized reduction gear unit having a casing, a shaft carried by the casing and defining a duct through the shaft, a driving element in the casing, means coupling the driving element to the shaft for alternating rotary movement of the shaft, the shaft having an end portion, a tubular connector for delivery of the screen washing liquid, the tubular connector having a bore, and the end portion of the shaft extending sealingly into the tubular connector, wherein the end portion of the shaft and the tubular connector together define mating coupling means which couple the tubular connector and the shaft together, whereby the tubular connector performs the same alternating rotary motion as the shaft, the end portion of the shaft having a terminal portion received in the bore of the tubular connector, the terminal portion being spherical to deform the bore radially outwardly, the end portion of the shaft having a knurled surface, the knurled surface being received in the bore of the tubular connector to couple the shaft and the tubular connector together in rotation, wherein the tubular connector has a tubular first portion for receiving the knurled surface end portion of the shaft and a tubular second portion for receiving the spherical terminal portion of the shaft, wherein the bore of the tubular connector in the tubular first portion thereof has a diameter different from the diameter of its bore in the tubular second portion.

3. A screen washing apparatus for screen washing liquid delivery comprising a motorized reduction gear unit having a casing, a shaft carried by the casing and defining a duct through the shaft, a driving element in the casing, means coupling the driving element to the shaft for alternating rotary movement of the shaft, the shaft having an end portion, a tubular connector for delivery of the screen washing liquid, the tubular connector having a bore, and the end portion of the shaft extending sealingly into the tubular connector, wherein the end portion of the shaft and the tubular connector together define mating coupling means which couple the tubular connector and the shaft together, whereby the tubular connector performs the same alternating rotary motion as the shaft, the end portion of the shaft having a terminal portion received in the bore of the tubular connector, the terminal portion being spherical to deform the bore radially outwardly, wherein the shaft has a shaft body, with the end portion of the shaft projecting axially from one end of the shaft body, the casing including a cover plate, with the shaft extending through the cover plate, and further including a ring molded onto the cover plate and surrounding the shaft body at the end of the latter, the tubular connector further including a radial collar portion which at least partially covers the molded ring to seal the apparatus against grease and dust.

4. Apparatus according to claim 3, wherein the radial collar portion has a projecting flange portion enclosing the molded ring.

5. A screen washing apparatus for screen washing liquid delivery comprising a motorized reduction gear unit having a casing, a shaft carried by the casing and defining a duct through the shaft, a driving element in the casing, means coupled with driving element to the shaft for alternating rotary movement of the shaft, the shaft having an end portion, a tubular connector for delivery of the screen washing liquid, the tubular connector having a bore, and the end portion of the shaft extending sealingly into the tubular connector, whereby the end portion of the shaft and the tubular connector together define mating coupling means which couple the tubular connector and the shaft together, wherein the tubular connector performs the same alternating rotary motion as the shaft, the end portion of the shaft having a terminal portion received in the bore of the tubular connector, the terminal portion being spherical to deform the bore radially outwardly, wherein the casing further includes an electronic housing, closing the casing and serving as a cover plate for the casing, the electronic housing having a cover plate, the electronic housing having a through hole, the shaft extending through the through hole, the shaft having a shaft body with the end portion of the shaft projecting axially from one end of the shaft body, the electronic housing having an axial projection surrounding the shaft body at its end, and the tubular connector including a radial collar portion at least partially enclosing the axial projection so as to prevent the ingress of pollutants into the apparatus.

6. Apparatus according to claim 5, wherein the closure plate has a through hole, with the shaft extending through the through hole in the cover plate.

7. A method of assembly for a screen washing apparatus for screen washing liquid delivery in which a shaft has an end portion and a bore formed in the shaft, the shaft having a knurled surface spaced from the end portion, the end portion having a spherical portion, a tubular connector having a bore therein, the bore having a smooth side wall, the method comprising the steps of:

presenting the end portion of the shaft in aligned relationship with the bore of the tubular connector; and effecting axial relative movement between the shaft and the tubular connector so that the shaft penetrates into the bore of the tubular connector whereby the knurled surface forms complementary grooves in the bore of the tubular connector, and the spherical portion of the shaft deforms the bore radially outwardly.

* * * * *